United States Patent
Lagares-Greenblatt et al.

(10) Patent No.: US 10,955,996 B2
(45) Date of Patent: Mar. 23, 2021

(54) COGNITIVE CONTACT ASSISTANCE WITH DYNAMICALLY GENERATED CONTACT LISTS FOR MESSAGES

(71) Applicant: International Business Machines Corporation, Armonk, NY (US)

(72) Inventors: Heidi Lagares-Greenblatt, Jefferson Hills, PA (US); Jenny S. Li, Cary, NC (US); Xinlin Wang, Irvine, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/176,438

(22) Filed: Oct. 31, 2018

(65) Prior Publication Data
US 2020/0133443 A1 Apr. 30, 2020

(51) Int. Cl.
| | |
|---|---|
| G06F 3/0482 | (2013.01) |
| H04L 29/12 | (2006.01) |
| G06Q 10/10 | (2012.01) |
| H04L 29/08 | (2006.01) |
| G06F 40/279 | (2020.01) |

(52) U.S. Cl.
CPC .......... G06F 3/0482 (2013.01); G06F 40/279 (2020.01); G06Q 10/107 (2013.01); H04L 61/1594 (2013.01); H04L 67/306 (2013.01)

(58) Field of Classification Search
CPC . G06F 3/0482; G06F 17/2765; G06Q 10/107; H04L 61/1594; H04L 67/306
See application file for complete search history.

(56) References Cited

U.S. PATENT DOCUMENTS

| | | | |
|---|---|---|---|
| 7,797,293 B2 | 9/2010 | Pabla et al. | |
| 7,836,068 B2 * | 11/2010 | Hamilton | G06Q 10/107 |
| | | | 707/767 |
| 7,962,506 B2 * | 6/2011 | Hamilton | G06Q 10/107 |
| | | | 707/767 |
| 8,577,895 B2 | 11/2013 | Gupta et al. | |
| 9,432,319 B2 * | 8/2016 | Dent | H04L 51/14 |
| 9,449,103 B2 | 9/2016 | Boland et al. | |
| 2004/0199582 A1 | 10/2004 | Kucharewski et al. | |
| 2005/0198172 A1 | 9/2005 | Appleman et al. | |
| 2006/0209690 A1 | 9/2006 | Brooke | |
| 2008/0147639 A1 | 6/2008 | Hartman et al. | |
| 2008/0263076 A1 | 10/2008 | Duffield et al. | |
| 2009/0327433 A1 * | 12/2009 | Comertoglu | G06F 3/167 |
| | | | 709/206 |
| 2010/0076989 A1 * | 3/2010 | Jakobson | G06Q 10/00 |
| | | | 707/758 |
| 2011/0055344 A1 * | 3/2011 | Hamilton | G06Q 10/107 |
| | | | 709/206 |

(Continued)

*Primary Examiner* — Shen Shiau
(74) *Attorney, Agent, or Firm* — Cantor Colburn LLP; Teddi Maranzano

(57) ABSTRACT

Aspects of the invention include providing cognitive contact assistance with dynamically generated contact lists for messages. Providing cognitive contact assistance includes performing by a processor, prior to a message created by a user being sent to a user interface of an intended recipient of the message: identifying content of the message; dynamically generating a contact list based at least in part on the content; and augmenting the message with the contact list. The augmented message is sent to the user interface of the intended recipient of the message.

16 Claims, 7 Drawing Sheets

(56) References Cited

U.S. PATENT DOCUMENTS

| | | | |
|---|---|---|---|
| 2012/0011426 A1* | 1/2012 | Yach | G06Q 10/107 |
| | | | 715/208 |
| 2014/0237055 A1* | 8/2014 | Burrell | H04L 51/28 |
| | | | 709/206 |
| 2014/0258420 A1* | 9/2014 | Dent | H04L 51/28 |
| | | | 709/206 |
| 2015/0007050 A1* | 1/2015 | Jakobson | H04L 51/16 |
| | | | 715/752 |
| 2017/0111298 A1* | 4/2017 | Tomkins | H04L 51/32 |

* cited by examiner

COGNITIVE CONTACT ASSISTANCE WITH DYNAMICALLY GENERATED CONTACT LISTS FOR MESSAGES

BACKGROUND

Embodiments of the present invention relate in general to using computer systems for electronic communication, and more specifically to cognitive contact assistance with dynamically generated contact lists for messages.

On a day to day basis, a typical worker may work on two or three different projects, each having different project teams. Switching from one project to another requires finding the materials relevant to the next project as well as finding the contacts associated with the next project. This is not always an easy task, especially as the number of ongoing projects increase. It can be difficult to keep track of contact lists of people who support particular projects and/or people having particular expertise. When working on a particular project, an employee may have to contact many different people including people that they work with on a regular basis, people that they may have not been in contact with for a long time, and people that they have not been in contact with in the past.

Accordingly, while computer systems for providing electronic communications are suitable for their intended purposes, what is needed are computer systems having certain features of embodiments of the present invention.

SUMMARY

Embodiments of the present invention include methods, systems, and computer program products for cognitive contact assistance with dynamically generated contact lists for messages. A non-limiting example method includes performing by a processor, prior to a message created by a user being sent to a user interface of an intended recipient of the message: identifying content of the message; dynamically generating a contact list based at least in part on the content; and augmenting the message with the contact list. The augmented message is sent to the user interface of the intended recipient of the message.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
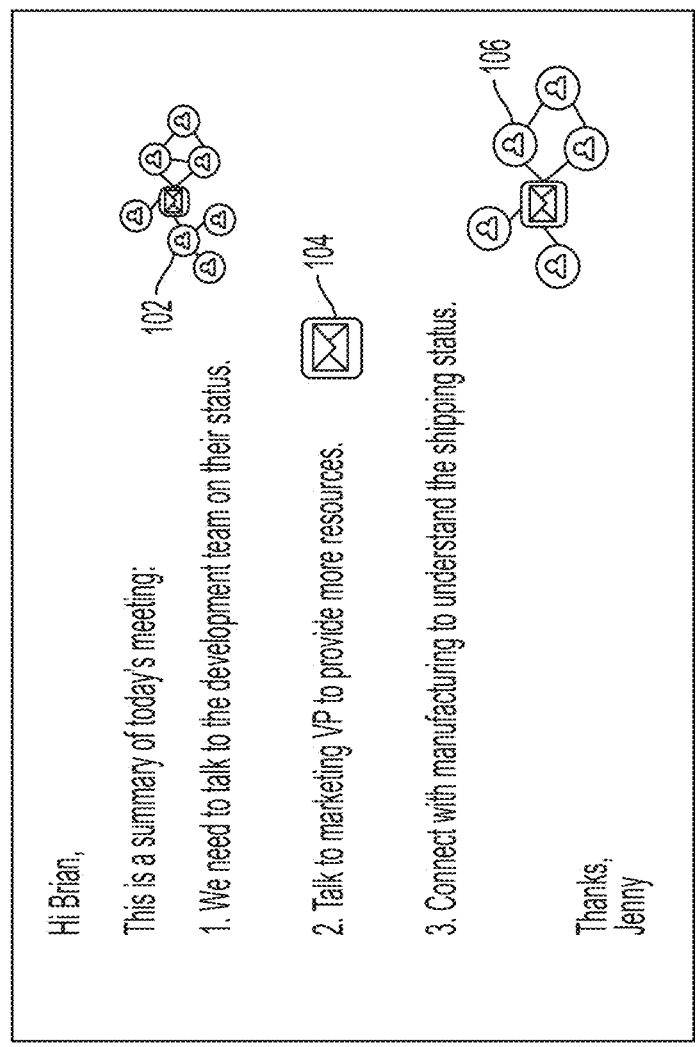
FIG. 1 depicts a message augmented with a plurality of contact lists in accordance with one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide cognitive contact assistance with dynamically generated contact lists for messages such as, but not limited to electronic mail (email) messages, text messages, voice messages, instant messages, and video messages. In accordance with one or more embodiments of the present invention, a dynamically generated contact list is embedded within the content of a message. In accordance with one or more embodiments of the present invention, one or more contact lists are generated based at least in part on analytics of the message content and/or message context. A cognitive capability is used to dynamically assist users in locating and/or creating contact lists of relevant contacts based for example, on an activity specified in the message and other content of the message. The content can include, but is not limited to text, social, image, and voice data.

Cognitive computing refers to leveraging information technology (IT) to improve a user's understanding of the world, and as a result of the improved understanding the user may make more informed or better decisions. One or more embodiments of the present invention leverage the concept of cognitive technology to help users with the creation and suggestion of contact lists depending on the content of a message drafted by the user. The system uses a cognitive engine to learn, record, and assist the users in performing follow up activities described in messages. As used herein, the term "cognitive contact assistance" refers to the use of advanced analytics, natural language processing and/or other cognitive computing technology to deliver advice to the user on a list of recommended contacts that is relevant to the user's current context or activity.

As used herein, the term "dynamically generated contact lists" refers to a list of contacts that is generated automatically in real time or near real time. As used herein, the term "contact list" refers to a list of one or more users including the users' names and their contact information (e.g., email addresses, telephone numbers). As used herein, the term "content" refers to words, ideas or topics. As used herein, the term "context" refers to the surroundings, circumstances, environment, background or settings that are related to the topics/content of the conversation.

For example, a user "A" can send a text message to a recipient user "B" about project "X". When recipient user B receives the message, one or more embodiments of the present invention will add one or more dynamically generated contact lists into the message. These dynamically generated contact lists provide assistance to the recipient(s) of the message about possible people to contact to perform an activity specified in the message. Tools such as, but not limited to Watson® Knowledge Studio from IBM can be used to create machine learning models to interpret context and content of the message.

One or more embodiments of the present invention provide a technological improvement over current electronic communication systems that do not mine the content of a message to provide a dynamically generated contact list. Contemporary electronic communication systems may provide contact lists based on the application that the user is currently using. Disadvantages of providing a single contact list for an application include not being able to vary the contact list based on content or context of a current message. One or more embodiments of the present invention mine the content and/or context of a message to dynamically generate a contact list. This can lead to a decrease in the use of processor, network, and human resources to determine who should be contacted about activity described in a message, and once the correct person(s) is identified determining how to contact them.

One or more embodiments of the present invention provide a technological improvement over current electronic communication systems that do not augment a message with a contact list to allow the user to see and access the contact list within a communication tool (e.g., email). Contemporary electronic communication systems do not provide the ability to automatically dynamically embed a contact list within the message for viewing by a sender or recipient of the message. One or more embodiments of the present invention embed a contact list that is generated based at least in part on content and/or context of a message and automatically embed it in the message. This can lead to a decrease in the use of processor, network, and human resources to determine who should be contacted about activities/action items described in a message and once the correct person(s) is identified determining how to contact them.

One or more embodiments of the present invention provide a technological improvement over current electronic communication systems that do not build a dynamic list of contacts. Disadvantages of not building dynamic contact lists is that contacts for a user sending the message must be defined in advance, or be contained in the user's address book. One or more embodiments of the present invention build dynamic contact lists and these contact lists may include contacts that are not in the user's address book and/or that have not been contacted by the user in the past. This can lead to a decrease in the use of processor, network, and human resources to determine who should be contacted about activities/action items described in a message and once the correct person(s) is identified determining how to contact them.

One or more embodiments of the present invention work in conjunction with a multiplicity of applications (e.g., over a cloud or at the enterprise level or over applications, etc.) and can learn from the user's behavior in order to provide a better estimate of what names should be applied to different scenarios. Contact lists can be dynamically generated based, for example on the actions, applications, and content of a message. One or more embodiments of the present invention can be embedded in applications and/or can include a stand-alone graphical user interface (GUI) for usability purposes. One or more embodiments of the present invention can be generating contact lists as the user types and/or talks (or performs any other action) or can be generating contact lists as other people take actions related to the user (e.g., receiving an email or other people talking to the user, etc.).

Turning now to FIG. 1, an email message 100 augmented with a plurality of contact lists is generally shown in accordance with one or more embodiments of the present invention. As shown in FIG. 1, content of the email message 100 is mined, or identified, and contact lists 102 104 106 are generated based at least in part on the content, and embedded in the email message 100. Context can also be used to determine a suggested list of contact people. In the email message 100 shown in FIG. 1, the content includes the text of the email message 100 and the context can include the recipient and the user sending the email message 100. Context of the message can also be identified by looking at Jenny and Brian's calendars for a title of a meeting that they held that day. The title may indicate the name of a team that the text "We need to talk to the development team" refers to. In addition, context can be inferred from previous messages sent between Jenny and Brian.

Contact list 102 includes suggested contacts on the development team for Brian and/or Jenny to talk to. In accordance with one or more embodiments of the present invention, when the email message 100 is read via a user interface device, the user can hover over each of the contacts in the contact list 102 to view additional information about the contact person (e.g., name, location, contact information, title, etc.). In addition, the user can select one or more of the contacts in the contact list 102 to automatically initiate a message with the selected contacts as recipients.

Contact list 104 includes the email address of the marketing vice-president. The marketing vice-president can be selected based at least in part on context such as, but not limited to, marketing vice-presidents that Jenny or Brian has contacted in the past, the marketing vice-president who has been contacted by other project members before, and/or the marketing vice-president in the company directory who is in the same organization as Jenny or Brian. Contact list 106 includes email addresses of manufacturing people involved with the project and/or meeting.

In accordance with one or more embodiments of the present invention, the sender of the email message 100 (Jenny) sends the email message 100 with just the text components (i.e., no contact lists). The contact lists 102 104 106 are added after the email message 100 is sent and before the recipient (Brian) opens the email message 100, so that when the recipient opens the email message 100 the email message 100 is augmented with the contact lists 102 104 106.

Figure 2:
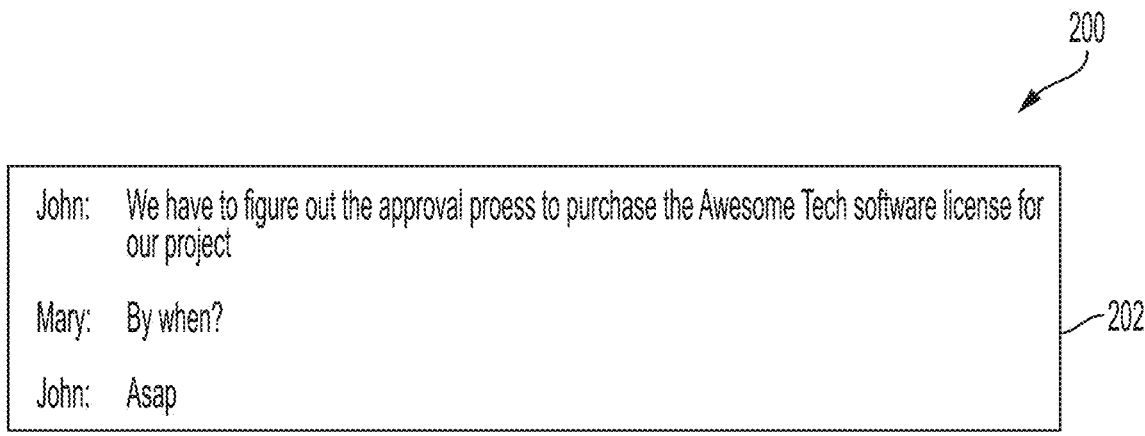
FIG. 2 depicts contact lists that are selected and displayed at a user interface based at least in part on content of a telephone conversation in accordance with one or more embodiments of the present invention.
Figure 2:
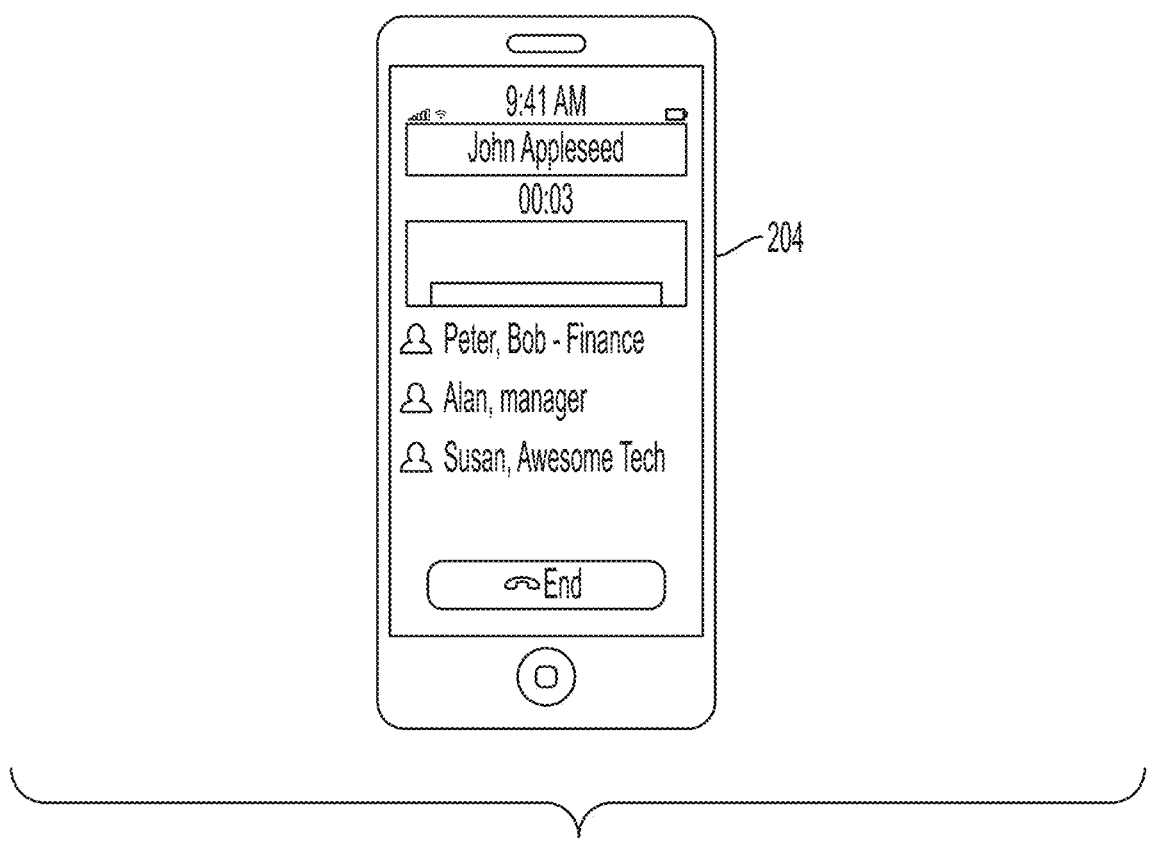

Turning now to FIG. 2, contact lists that are selected and displayed at a user interface 204 based at least in part on content of a telephone conversation 202 are generally shown in accordance with one or more embodiments of the present invention. The user interface 204 shown in FIG. 2 can be located on a mobile telephone that has a cognitive assist application enabled to implement one or more embodiments of the present invention. With the contact assistant application enabled on the mobile device, cognitive capability is used to analyze a telephone conversation 202, and to create a contact list(s) based at least in part on content of the telephone conversation 202. In accordance with one or more embodiments of the present invention, the mobile telephone has voice to text conversion software that converts the voice conversation to the content of the telephone conversation 202 shown in FIG. 2.

Based at least in part on context, it is understood that "our project" is referring to the current project that both John and Mary are working on. In addition, it is understood that the activity "purchase software license" should involve the finance team (Peter and Bob) as well John's manager, Alan as shown at the user interface 204. Peter and Bob's names may be obtained using a company directory to determine who is responsible for software licensing and/or by determining the finance people that John and/or Mary and/or Alan have worked with in the past. In addition, based at least in part on cognitive analysis, it is understood that the "Awesome Tech software license" will involve the sales people from Awesome Tech, shown as Susan from Awesome Tech in the user interface 204. As the conversation progresses, additional automatically generated contact lists are displayed on the user interface 204. In accordance with one or more embodiments of the present invention, the user can hover over each of the contacts displayed on the user interface 204 to view additional information about the contact person. In addition, the use can select one or more of the contacts shown on the user interface 204 and initiate a message (e.g., email, text, telephone) with the selected contacts as recipients.

In accordance with one or more embodiments of the present invention, a copy of the text of the telephone conversation 202 as translated by the voice to text conversion software is logged so that the user can review and see the text that prompted the generation of the particular contact lists.

In accordance with one or more embodiments of the present invention, when a user is talking over the telephone, the context of the conversation is recognized, as well as the parties on the telephone call, and used to identify people that are relevant to the current work. This can be suggested to the user, as a contact list of one or more contacts, during or after the telephone call in order to better help the user phone conversations (or conference calls). For example, the user can reach out to one or more of the recommended contacts for following up on the topics discussed during the telephone call.

One or more embodiments of the present invention can also be used for client projects. For example, a user may have a briefing with a customer who works at company ABC. The user may perform an on-line search, using Google for example, of the company's background information, and while the user is performing the search one or more embodiments of the present invention will create a list of people that are relevant to company ABC. These people are sorted into categories such as, but not limited to name, rank or position in the company, department, the number of interactions (such as emails, instant messaging, telephone calls etc.) or relationships with the user. The list of people is automatically created as a contact list on the user's Google chat. This contact list is dynamic and may change based at least in part on characteristics of the user such as, but not limited to the current activities that the user is working on. As time goes by, if the user has contacted any of these people from the dynamically generated contact list, the system will learn the user's behavior and streamline the people of the dynamic contact list, move people from one category to another, add or remove one or more people, etc.

One or more embodiments of the present invention can also be used by persistent instant messaging systems by providing a user with the ability to search for a project name or a client, and the system generating a suggested contact list based at least in part on the search criteria. For example, the user can search for "z13s project" or a client such as "Compuware" and the system will return a list of suggested contacts. The user can look through the list of suggested contacts and select or deselect names. The system can also learn from that behavior or study the interactions between the user and the suggested people to fine tune the recommended contact list.

Figure 3:
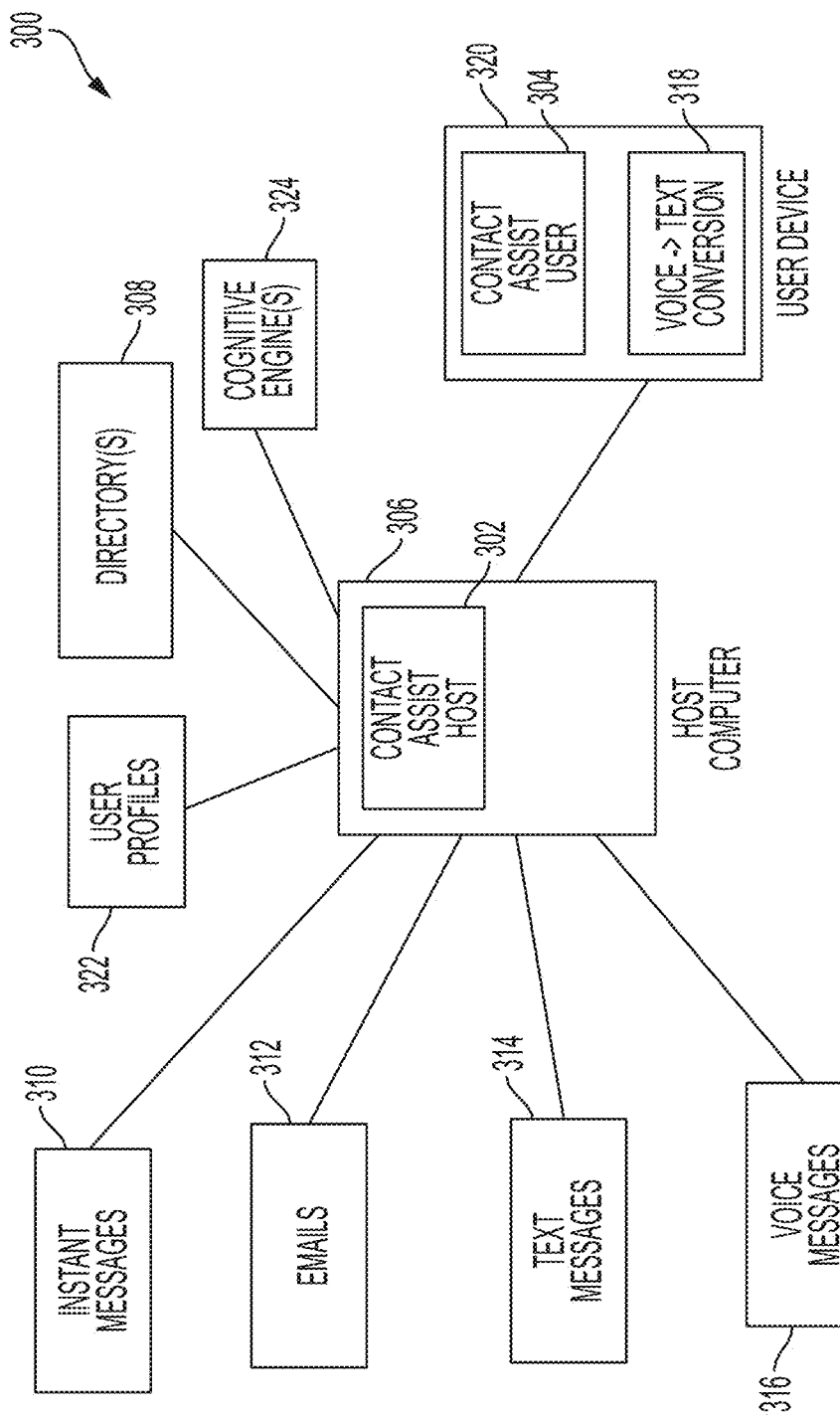
FIG. 3 depicts a system for performing cognitive contact assistance with dynamically generated contact lists for messages in accordance with one or more embodiments of the present invention.

Turning now to FIG. 3, a system 300 for performing cognitive contact assistance with dynamically generated contact lists for messages is generally shown in accordance with one or more embodiments of the present invention. As shown in FIG. 3, a user device 320 executing contact assist user software 304 is in communication (e.g., via a network) with a host computer 306 executing contact assist host software 302. The user device 320 shown in FIG. 3 also includes voice to text conversion software 318. The text that reflects a voice conversation can be stored in voice messages database 316. In accordance with one or more embodiments of the present invention, the user device 320 does not execute contact assist user software 304 and instead accesses the contact assist host software 302 executing on the host computer 306 to perform the processing described herein.

The user device 320 shown in FIG. 3 can be implemented by any computer device known in the art such as, but not limited to: a mobile device; a laptop computer; a desktop computer; a monitor; a smartphone; a tablet computer; and a smart television. In accordance with one or more embodiments of the present invention, the user device 302 is implemented by one of the computing devices 54A-N of FIG. 5 below and the host computer 306 is implemented by a cloud computing node 10 of FIG. 5 below.

Also shown in FIG. 3 are sources of messages that can utilized by the contact assist host 302 to provide context for generating suggested contact lists for a current message including, but not limited to instant messages database 310, emails database 312, text messages database 314, and voice messages database 316. In addition, FIG. 3 includes one or more directory databases 308 and a user profiles database 322 that can be utilized by the contact assist host 302 along with cognitive engine(s) 324 to generate suggested contact lists. One or more of the instant messages database 310, emails database 312, text messages database 314, voice messages database 316, directory databases 308, user profiles database 322, and cognitive engine(s) can be coupled to the host computer 304 via one or more networks.

In accordance with one or more embodiments of the present invention, the contact assist user 304 is embedded, or executing, on the user device 320 in order to determine content of messages. From the content point of view, one or both of the contact assist user 304 and the contact assist host 302 can use cognitive engine(s) 324 to detect and understand messages that include, but are not limited to: text, voice, voice conversions, image, and image processing. In one or more embodiments of the present invention the cognitive engine(s) are included as part of the contact assist user 304 and the contact assist host 302 and not separate component as shown in FIG. 3. In accordance with one or more embodiments of the present invention, one or both of the contact assist user 304 and the contact assist host 302 use history data (public and/or private) to make recommendations based at least in part on the content. If there is not data related to the content or person, the system will create new data entries with this data to be used in the future. In accordance with one or more embodiments of the present invention, the history data is obtained from the instant messages database 310, the emails database 312, the text messages database 314, the voice messaged database 316 and the user profiles database 322.

The instant messages database 310 can include previously sent instant messages between different users. Similarly, the emails database 312 can include email messages previously sent between different users, the text message database 314 text messages previously sent between different users, and the voice messages database 316 text versions of voice messages and voice conversations previously occurring between different users. In an embodiment, for the voice option, the voice files are saved along with the transcription of the voice to text translation. In accordance with one or more embodiments of the present invention, logs of how the contact lists where created are stored so that a user search and understand how the system created the list. The logs may be stored, for example, in a log database (not shown in FIG. 3).

In accordance with one or more embodiments of the present invention, the directory database 308 includes context of the user and the list of generated contacts. This database can include both history data and new data that is dynamically generated in real time or near real time. For example, Mary discusses a potential trip to an external conference in a phone call with her coworker. She mentioned about requesting a budget approval for her trip. Our system recognizes the content of the discussion is about budget, and it generates a list of recommended Finance contacts (includes Peter and John) for Mary based at least in part on the content. However, the system also realizes the context that any new budget would require senior management approval, and the system would include Larry, Mary's VP to the recommended contact list. As time goes by, more recommended contacts for certain context are added to the database. The system can compare to the newly generated recommended contact list with the historical data from the database. If any contacts from the new generated list are also in the historical data, these contacts would be marked with higher score as they are repeatedly recommended. The system can also be configured to reference the historical database first before generating a list of recommended contacts.

In accordance with one or more embodiments of the present invention, the user profiles database 322 includes the list of context or activities that the user has engaged in the past and the corresponding contacts that the user has contacted before. For example in the previous example, the system generates two financial contacts for Mary regarding her request for a budget approval. The two contacts are Peter and John. However, Mary prefers to contact John because Mary actually had worked with John in the past and Mary does not know Peter. The user profile database 322 will show that Mary has preference for John over Peter. In the future when Mary encounters another budget approval request, the system can first refer to the user profile database 322 to see to identify any individual that Mary prefers and verify whether the individual is still a valid contact for the context before a new list of contacts is generated.

One or more embodiments of the present invention cross reference a user's profile and behavior to determine relations between a user and a contact list. For example, the system can check various data including and not limiting to: the user's contact lists on his/her work computer, personal contacts on his/her phone, email exchanges, organizational structure, geographical locations, social networks relationships etc. In the previous example, the system has recommended two financial contacts for Mary. The system has recognized that Mary has worked with John in the past as Mary has sent email to John in the past. As the system discovers relationships between John and Mary, John is listed as a higher ranked recommended contact for Mary than Peter.

The system will create maps of the contact lists and will continuously learn from the user's behaviors and tasks. In the example, the system has learned that Mary prefers contacts that she has worked with in the past than any new contacts. Mary prefers to reach out to John because she has worked with John before. She has not contacted Peter even though Peter lives in the same town. The system will learn the user's behaviors from the information captured from the user's profile. The system can factor in the user's preferences and behavior when making a recommended contact list for the user.

In accordance with one or more embodiments of the present invention, contact assist software is embedded into a user's applications (e.g., email application, texting application) in order to learn the user's behavior/relationships. In accordance with one or more embodiments of the present invention, the contact assist software is embedded at the corporation/employee level, so that the contact assist software can make better suggestions based on the professional experience of employees by learning the user's preferences and behavior on recommended contact list. In accordance with one or more embodiments of the present invention, the contact assist software will not only match people based at least in part on a project name or content but will also take relationship history into account in order to make more targeted suggestions to the user.

One or more embodiments of the present invention described herein can be used in conjunction with messaging applications such as, but not limited to: email, telephone phone calls, instant messaging lists/groups, calendars, wikis, blogs, and social networks. For example, when a person is creating an invite in a social network platform, a distribution list, or contact list, can be suggested based at least in part on the content of the event and date. In another example, when a user is writing an email related to a particular project or subject, distribution lists, or content lists, for the email can be suggested based at least in part on the content and the history of that particular project.

In accordance with one or more embodiments of the present invention, content that includes comment(s) about names and projects is analyzed to provide a potential contact list(s) or contact information based at least in part on content of the conversation including the activities or next step(s) mentioned in the message.

Figure 4:
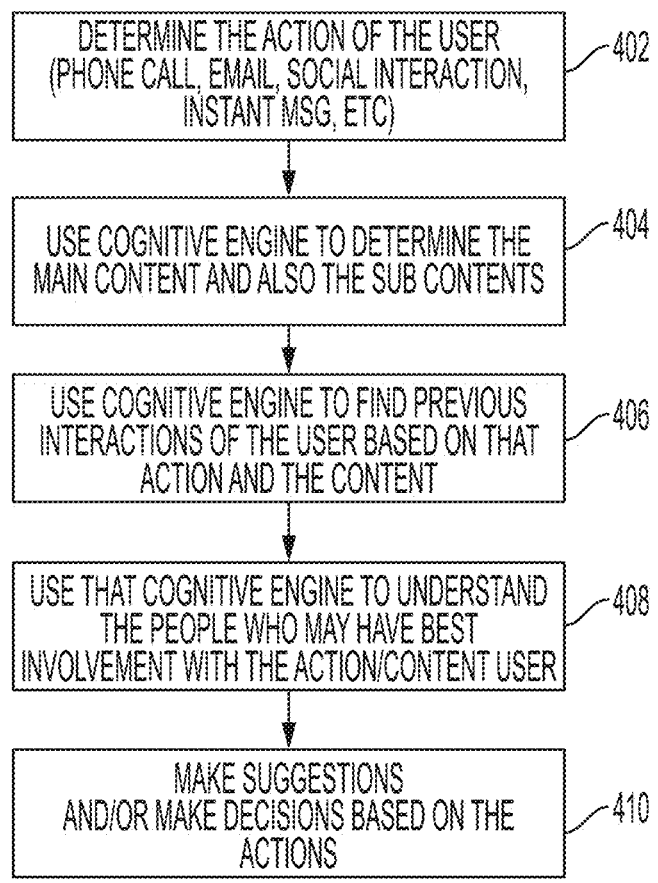
FIG. 4 is a flow diagram of a process for providing cognitive contact assistance with dynamically generated contact lists for messages in accordance with one or more embodiments of the present invention.

Turning now to FIG. 4, a flow diagram 400 of a process for providing cognitive contact assistance with dynamically generated contact lists for messages is generally shown in accordance with one or more embodiments of the present invention. The processing shown in FIG. 4 can be implemented by one or both of the contact assist host 302 executing on the host computer 306 and the contact assist user 304 executing on the user device 320. At block 402, an action of the user is determined. The action may include, but is not limited to, initiating a telephone call, an email, a social interaction (e.g., establishing a friendship relationship in a social network), or an instant message.

At block 404 a content mining cognitive engine implemented by the contact assist software is used to determine, or mine, the content of the message. The content can include main content and sub-content(s). The content mining cognitive engine can include a machine learning model that has been trained to identify particular keywords related to the user, related to a department that the user works in, and/or to a company that the user works for. These can be related to a particular person or group of people (e.g., vice-president of marketing), to a team, to an activity (e.g., purchase, review), or to a project. In the example, Mary would like to get travel approval for an external conference. She mentioned the event in a phone call with her coworker. The cognitive engine uses natural language processing, advanced analytics and other cognitive technologies to determine the content and context of the discussion. It is determined that content or topic is about budget approval. The cognitive engine looks up Mary's organization to determine both John and Peter are the financial staff of her organization. The engine also looks up the company's travel policy from internal company webpages and discovers that travel request requires senior management's approval. The cognitive engine looks up Mary's organizational structure and identifies Larry, Mary's VP, as the approver. The cognitive engine has recommended Mary to talk to John and Peter for budget such as the estimate of her travel expenses, and recommends Mary to talk to Larry, her VP, for travel approval.

At block 406, the keywords are analyzed to find previous interactions of the user based at least in part on the content. In accordance with one or more embodiments, the previous interactions are determined based at least in part on the identified content, or keywords. A contact locating cognitive engine implemented by the contact assist software can be used to find previous interactions of the user based at least in part on content. The contact locating cognitive engine can be trained to identify one or more contacts based at least in part on the identified keywords. At block 408, the contact locating cognitive engine selects all or a subset of the identified contacts and at block 410, the selected contacts are added to the message. The user's preferences and behaviors of the recommended contact list will be captured in the user's profile. For example, the system has recommended John and Peter as financial advisors for Mary regarding her desire to attend an external conference. Mary prefers to contact John instead of Peter because Mary has working relationships with John in the past. When Mary reaches out to John, her action is captured as historical data. The cognitive engine will use the historical data of Mary's preferences and behavior as training data to improve future recommendation for Mary.

In accordance with one or more embodiments of the present invention, the cognitive engines are retrained on a periodic basis (e.g., weekly, monthly, or daily) and/or upon request by the user (e.g., when starting a new project or a new job position that utilizes different keywords).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
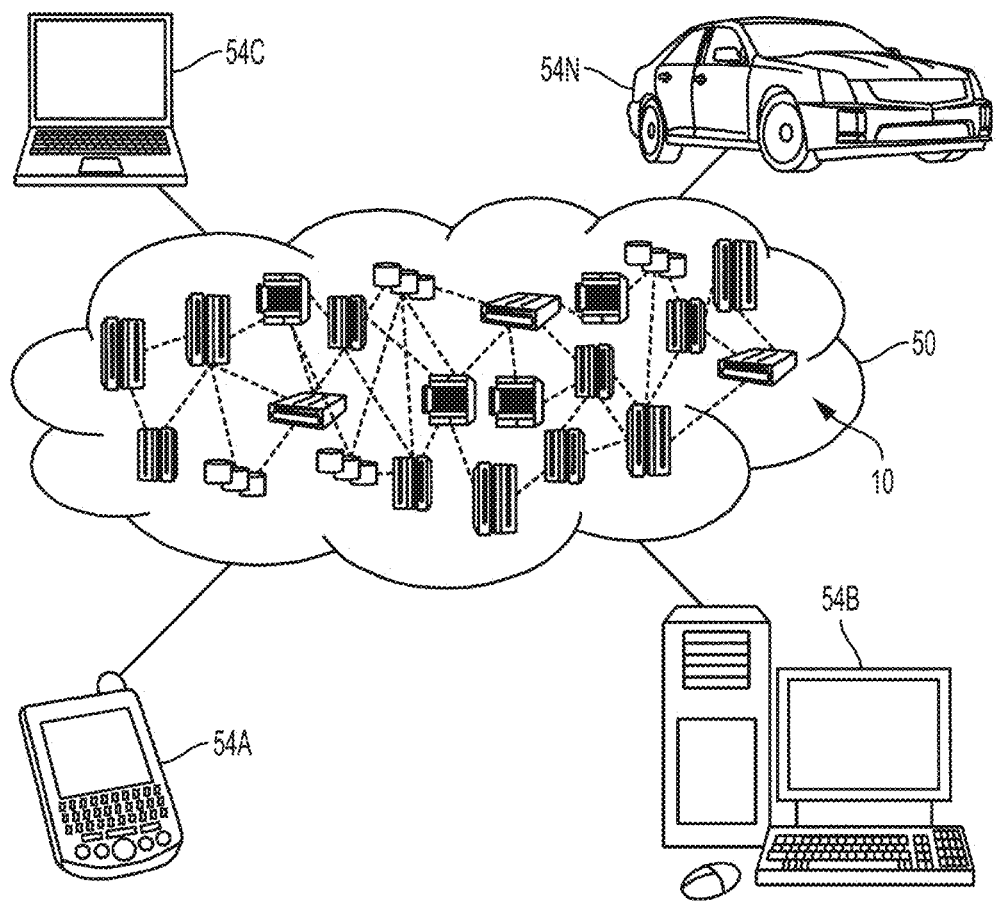
FIG. 5 depicts a cloud computing environment according to one or more embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
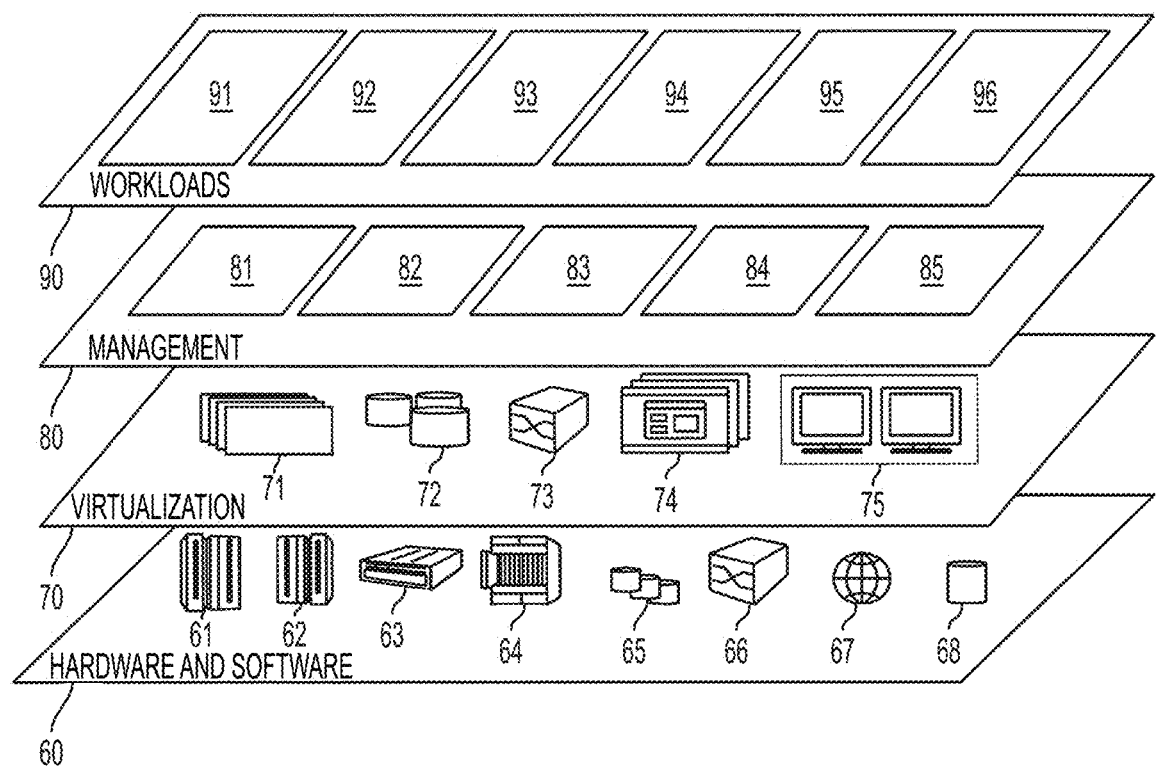
FIG. 6 depicts abstraction model layers according to one or more embodiments of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

In accordance with one or more embodiments of the present invention, the system 300 shown in FIG. 3 is located in the cloud computing environment of FIG. 6 where all or a subset of the processing shown in FIGS. 1-4 is performed.

Figure 7:
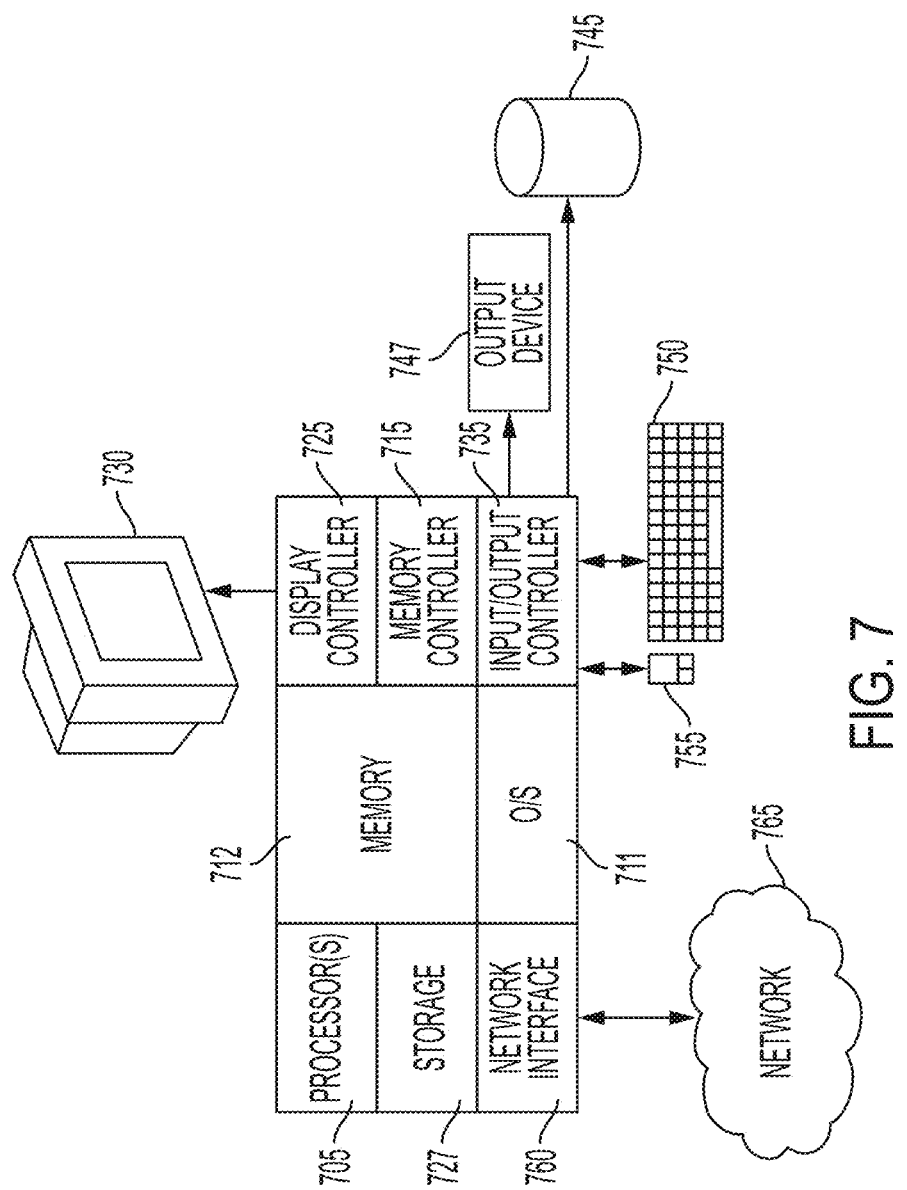
FIG. 7 is a block diagram of a computer system for implementing some or all aspects of performing cognitive contact assistance with dynamically generated contact lists for messages according to one or more embodiments of the present invention.

Turning now to FIG. 7, a block diagram of a computer system for implementing some or all aspects of performing cognitive contact assistance with dynamically generated contact lists for messages is generally shown in accordance with one or more embodiments of the present invention. The processing described herein may be implemented in hardware, software (e.g., firmware), or a combination thereof. In an exemplary embodiment, the methods described may be implemented, at least in part, in hardware and may be part of the microprocessor of a special or general-purpose computer system, such as a mobile device, personal computer, workstation, minicomputer, or mainframe computer. In an embodiment the electronic device 104 of FIG. 1 is implemented by the computer system shown in FIG. 7.

In an exemplary embodiment, as shown in FIG. 7, the computer system includes a processor 705, memory 712 coupled to a memory controller 715, and one or more input devices 745 and/or output devices 747, such as peripherals, that are communicatively coupled via a local I/O controller 735. These devices 747 and 745 may include, for example, a printer, a scanner, a microphone, and the like. A conventional keyboard 750 and mouse 755 may be coupled to the I/O controller 735. The I/O controller 735 may be, for example, one or more buses or other wired or wireless connections, as are known in the art. The I/O controller 735 may have additional elements, which are omitted for simplicity, such as controllers, buffers (caches), drivers, repeaters, and receivers, to enable communications.

The I/O devices 747, 745 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 705 is a hardware device for executing hardware instructions or software, particularly those stored in memory 712. The processor 705 may be a custom made or commercially available processor, a central processing unit (CPU), an auxiliary processor among several processors associated with the computer system, a semiconductor based microprocessor (in the form of a microchip or chip set), a microprocessor, or other device for executing instructions. The processor 705 can include a cache such as, but not limited to, an instruction cache to speed up executable instruction fetch, a data cache to speed up data fetch and store, and a translation look-aside buffer (TLB) used to speed up virtual-to-physical address translation for both executable instructions and data. The cache may be organized as a hierarchy of more cache levels (L1, L2, etc.).

The memory 712 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 712 may incorporate electronic, magnetic, optical, or other types of storage media. Note that the memory 712 may have a distributed architecture, where various components are situated remote from one another but may be accessed by the processor 705.

The instructions in memory 712 may include one or more separate programs, each of which comprises an ordered listing of executable instructions for implementing logical functions. In the example of FIG. 7, the instructions in the memory 712 include a suitable operating system (OS) 711. The operating system 711 essentially may control the execution of other computer programs and provides scheduling, input-output control, file and data management, memory management, and communication control and related services.

Additional data, including, for example, instructions for the processor 705 or other retrievable information, may be stored in storage 727, which may be a storage device such as a hard disk drive or solid state drive. The stored instructions in memory 712 or in storage 727 may include those enabling the processor to execute one or more aspects of the dispatch systems and methods of this disclosure.

The computer system may further include a display controller 725 coupled to a display 730. In an exemplary embodiment, the computer system may further include a network interface 760 for coupling to a network 765. The network 765 may be an IP-based network for communication between the computer system and an external server, client and the like via a broadband connection. The network 765 transmits and receives data between the computer system and external systems. In an exemplary embodiment, the network 765 may be a managed IP network administered by a service provider. The network 765 may be implemented in a wireless fashion, e.g., using wireless protocols and technologies, such as WiFi, WiMax, etc. The network 765 may also be a packet-switched network such as a local area network, wide area network, metropolitan area network, the Internet, or other similar type of network environment. The network 765 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods for performing cognitive contact assistance with dynamically generated contact lists for messages can be embodied, in whole or in part, in computer program products or in computer systems, such as that illustrated in FIG. 7.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising: performing, by a processor, prior to a message created by a user being sent to a user interface of an intended recipient of the message: identifying content of the message; dynamically generating a plurality of contact lists based at least in part on the content, at least one of the plurality of contact lists comprising a plurality of contacts; and augmenting the message with a graphical representation of at least two of the plurality of contact lists; and sending the augmented message to the user interface of the intended recipient of the message; wherein the intended recipient can hover over each of the plurality of contacts in the graphical representation of the at least two contact lists to view their contact information.

2. The method of claim 1, wherein the identifying content comprises performing text analytics to extract keywords.

3. The method of claim 1, wherein the generating the plurality of contact lists are further based at least in part on previous messages created by the user and previous messages received by the user.

4. The method of claim 1, wherein the generating the plurality of contact lists are further based at least in part on characteristics of the intended recipient.

5. The method of claim 1, wherein the generating the plurality of contact lists are further based at least in part on an activity specified by the content of the message.

6. The method of claim 1, wherein the generating the plurality of contact lists are further based at least in part on a directory of contacts.

7. The method of claim 1 wherein each of the plurality of contacts in the graphical representation of the at least two contact lists are selectable at the user interface by the intended recipient to automatically initiate a message with selected contacts as recipients.

8. A system comprising: a memory having computer readable instructions; and one or more processors for executing the computer readable instructions, the computer readable instructions controlling the one or more processors to perform operations comprising: performing prior to a message created by a user being sent to a user interface of an intended recipient of the message: identifying content of the message; dynamically generating a plurality of contact lists based at least in part on the content, at least one of the plurality of contact lists comprising a plurality of contacts; and augmenting the message with a graphical representation of at least two of the plurality of contact lists; and sending the augmented message to the user interface of the intended recipient of the message; wherein the intended recipient can hover over each of the plurality of contacts in the graphical representation of the at least two contact lists to view their contact information.

9. The system of claim 8, wherein the identifying content comprises performing text analytics to extract keywords.

10. The system of claim 8, wherein the generating the plurality of contact lists are further based at least in part on previous messages created by the user and previous messages received by the user.

11. The system of claim 8, wherein the generating the plurality of contact lists are further based at least in part on characteristics of the intended recipient.

12. The system of claim 8, wherein the generating the plurality of contact lists are further based at least in part on an activity specified by the content of the message.

13. The system of claim 8, wherein the generating the plurality of contact lists are further based at least in part on a directory of contacts.

14. The system of claim 8, wherein each of the plurality of contacts in the graphical representation of the at least two contact lists are selectable at the user interface by the intended recipient to automatically initiate a message with selected contacts as recipients.

15. A computer program product comprising a computer readable storage medium having program instructions embodied therewith, the program instructions executable by a processor to cause the processor to perform operations comprising: performing prior to a message created by a user being sent to a user interface of an intended recipient of the message: identifying content of the message; dynamically generating a plurality of contact lists based at least in part on the content, at least one of the plurality of contact lists comprising a plurality of contacts; and augmenting the message with a graphical representation of at least two of the plurality of contact lists; and sending the augmented message to the user interface of the intended recipient of the message; wherein the intended recipient can hover over each of the plurality of contacts in the graphical representation of the at least two contact lists to view their contact information.

16. The computer program product of claim 15, wherein the generating the plurality of contact lists are further based at least in part on previous messages created by the user and previous messages received by the user.

* * * * *